United States Patent [19]

Harding et al.

[11] Patent Number: 4,740,778

[45] Date of Patent: Apr. 26, 1988

[54] APPARATUS FOR DETECTING A FAILED RESOLVER

[75] Inventors: Joseph J. Harding, Mentor; Victor E. Noviski, Willoughby Hills, both of Ohio

[73] Assignee: Caterpillar Industrial Inc., Mentor, Ohio

[21] Appl. No.: 62,037

[22] Filed: Jun. 15, 1987

[51] Int. Cl.⁴ .......................... G08B 21/00; B62D 5/04; G05B 19/31; A01B 41/06
[52] U.S. Cl. ................................... 340/635; 340/671; 340/658; 180/79.1; 180/168; 180/169; 172/2; 172/3; 303/92; 318/605; 324/161
[58] Field of Search ............... 340/635, 658, 660, 663, 340/670, 671, 672, 686, 870.31, 870.25, 679; 73/493, 494; 324/161, 521; 180/79.1, 168, 169; 188/181 A, 181 C; 172/2, 3, 7, 8, 10, 11, 12; 303/20, 92, 95, 100, 101; 37/DIG. 19; 116/31, 35 R, 37; 371/1, 3, 4, 14; 318/605, 661

[56] References Cited
U.S. PATENT DOCUMENTS 4,355,305 10/1982 Cording et al. ................ 340/870.31
4,446,950 5/1984 Wise et al. ...................... 188/181 A Primary Examiner—Joseph A. Orsino
Assistant Examiner—Jill D. Jackson
Attorney, Agent, or Firm—Terry D. Morgan; Robert E. Muir

[57] ABSTRACT

In the field of automated guided vehicles it is particularly important that speed and steering angle feedbacks be accurate and reliable. Any deviations in these feedback signals should be promptly detected and used to alter operation of the vehicle. An apparatus constantly monitors the time varying output signals of a pair of resolvers respectively associated with wheel rotation and steering angle. The loss of either of the resolver signals for more than a preselected duration of time related to the excitation frequency and vehicle speed results in the power delivered to an electric drive motor being discontinued and the vehicle brakes being applied.

7 Claims, 4 Drawing Sheets

APPARATUS FOR DETECTING A FAILED RESOLVER

DESCRIPTION

1. Technical Field

This invention relates generally to an apparatus for detecting a failed resolver and more particularly to an apparatus for use on an automated guided vehicle to detect the loss of a signal corresponding to either vehicle speed or direction of steering angle.

2. Background Art

In the field of automated guided vehicles (AGV), it is of particular importance that the location of the vehicle is constantly monitored. For a dead reckoning AGV, the accuracy of this information is critical to maintain controllability of the vehicle. For example, the vehicle is used to accept and deposit loads at highly defined locations and, therefore, must be accurately positionable particularly if the load is to be machined. Piece parts that require machining at the defined locations need positioning within thousandths of an inch.

During dead reckoning, to discern vehicle position, the rotational position of the wheel and the steering direction must be constantly monitored. The accuracy of these parameters has obvious ramifications on the positionable accuracy of the vehicle. One type of sensor capable of delivering the accuracy required by both parameters is a resolver. A first resolver is connected to rotate in unison with a wheel of the vehicle and a second resolver is connected to rotate in unison with the steering angle of the steerable vehicle wheel. Each resolver is excited by a constant frequency signal and in turn delivers a pair of constant frequency signals which have a magnitude and phase relationship proportional to their respective angular positions. The resolvers are capable of delivering signals that are accurate to within 0.00038 radians.

Any momentary loss of the resolver signals results in a lost vehicle capable of undesirable movement. AGV's are required to have collision avoidance hardware such as infrared scanners and impact sensitive bumpers, thus even a lost vehicle can avoid undesirable contact. However, the general perception of driverless vehicles is, at best, cautious acceptance. Accordingly, a lost driverless vehicle wandering aimlessly through the factory will likely have serious repercussions on its perceived usefulness.

Moreover, a loss of either of the resolver signals renders the vehicle unproductive and can only be returned to productivity by appropriate service work. Therefore, timely recognition and indication of a fault reduces the necessary downtime and has an overall positive effect on vehicle productivity.

The present invention is directed to overcoming one or more of the problems as set forth above.

DISCLOSURE OF THE INVENTION

In one aspect of the present invention, an apparatus selectively discontinues operation of the work vehicle drive system. The work vehicle has a plurality of wheels wherein at least one of the wheels is controllably steerable. The apparatus includes a first resolver connected to and rotatable with at least one of the wheels of the work vehicle. The resolver is adapted for delivery of time varying signals wherein the difference between the average magnitudes and instantaneous phase angles of the signals is responsive to the angular rotational position of the wheel. A second resolver is connected to and rotatable with the steering angle of the steerable wheel; the second resolver is adapted for delivering a pair of time varying signals wherein the difference between the average magnitudes and instantaneous phase angles of the signals is responsive to the angular steering position of the steerable wheel. A means receives each of the time varying signals and delivers a fault signal in response to both the signals delivered by at least one of the resolvers being less than a preselected magnitude. A means interrupts power delivered to the drive system in response to receiving the fault signal.

The present invention provides an apparatus which quickly and reliably detects the loss of either a vehicle speed signal or steering angle signal of an automatic guided vehicle. The apparatus discontinues operation of the vehicle drive system and signals the type of fault to the service personnel.

BRIEF DESCRIPTION OF THE DRAWINGS

For a better understanding of the present invention, reference may be made to the accompanying drawings in which.

BEST MODE FOR CARRYING OUT THE INVENTION

Figure 1:
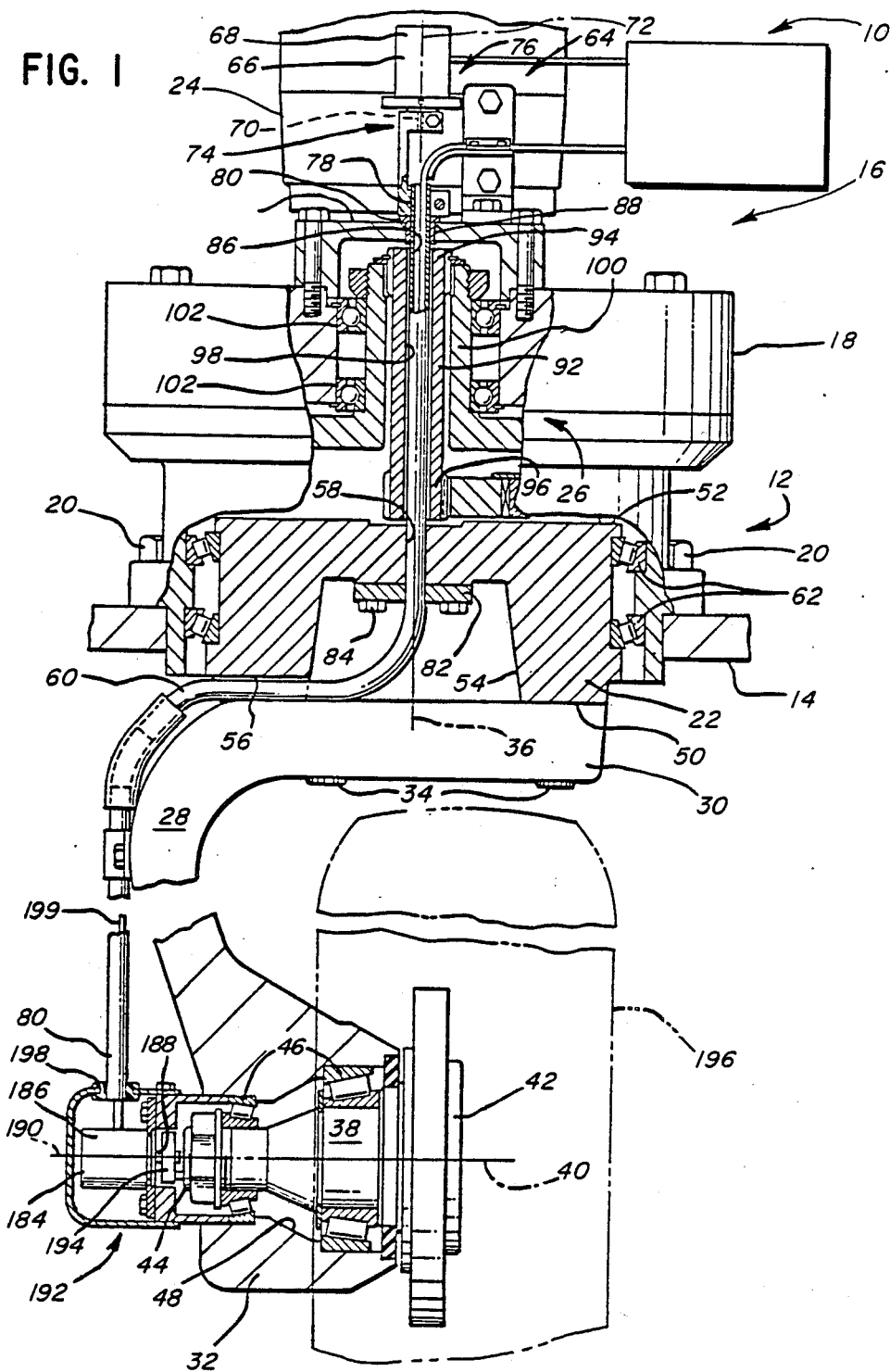
FIG. 1 is a schematic representation of a steerable wheel of an automatic guided vehicle.

With reference to the drawings and particularly FIG. 1 where an embodiment of the apparatus 10 is shown, the work vehicle 12, for example, an automatic guided vehicle, a lift truck, tow vehicle and the like, has a frame 14 and an axle assembly 16 mounted thereon. The axle assembly 16 preferably has a housing 18 connected to the vehicle frame 14 by a plurality of fasteners 20, an output member 22 rotatably mounted in the housing 18, and a power means 24, for example, a drive motor mounted on the housing 18 and rotatably connected to the output member 22. A transmission 26, preferably a planetary transmission, is connected to and between the rotary output (not shown) of the drive motor 24 and the output member 22.

A support bracket 28 has first and second end portions 30, 32 and is connected to the output member 22 at its first end portion 30 by a plurality of fasteners 34. The support bracket 28 is pivotal with and in response to rotary motion of the output member 22 about a longitudinal axis 36. A spindle 38 has a longitudinal axis 40 and first and second end portions 42, 44. A plurality of bearings 46 are disposed in a bore 48 in the support bracket second end portion 32. The bearings 46 support the spindle 38 for rotation about the spindle axis 40.

The output member 22 has first and second spaced apart ends 50, 52 which are preferably parallel to one another and normal to the axis 36. A recess 54 is disposed axially in the output member 22 and opens at the first end 50. An opening 56 is disposed radially in the output member 22. An aperture 58 is disposed axially in the output member 22 and opens at the first and second end portions 50, 52. Preferably, the aperture 58 lies along the axis 36 and opens at the first end portion 50 into the recess 54. The opening 56 and the aperture 58 are of the size sufficient to pass a connecting shaft 60 therethrough. A pair of anti-friction bearing 62, which are preferably tapered roller bearings, mount the output member 22 in the housing 18 for rotation about the axis 36.

A mounting arrangement 64 connects a first sensor 66 to the housing 18 and output member 22. The first sensor 66 has a body 68 and an input shaft 70. The input shaft 70 is connected to the body 68 in any suitable manner by which the input shaft 70 may be rotatable about an input shaft axis 72. The arrangement 64 includes a first means 74 for connecting the input shaft 70 to the output member 22 in a location spaced from the output member 22 and substantially aligning input shaft axis 72 with the output member axis 36. The input shaft 70 is rotatable in response to and with rotation of the output member 22. The mounting arrangement 64 includes a second means 76 for connecting the body 68 of the first sensor 66 to the housing and maintaining the body 68 against rotation about the input shaft axis 72 and reducing forces applied to the sensor body 68. The second means 76 is movable in at least one of an axial and a radial direction relative to the input shaft 70 in response to the input shaft 70 applying a force on sensor body 68.

The connecting shaft 60 has first and second end portions 78, 80 and is connected to the output member 22. The connecting shaft 60 is disposed in the aperture 58 and extends outwardly therefrom along the axis 36 to a location at which the first end portion 78 is spaced from the output member second end 52. A flange 82 is connected to the connecting shaft 60 in a location spaced from the connecting shaft's first end portion 78 by a suitable fastening technique such as welding, brazing, pressing, and the like. Means 84, for example, a threaded fastener, is provided for connecting the flange 82 to the first end 50 of the output member 22. More specifically, the flange is disposed in the recess 54 and connected thereto by a plurality of threaded fasteners 84; thus, the connecting shaft 60 is rotatable with rotation of the output member 22. Preferably, the connecting shaft 60 is tubular and has an aperture 86 which extends along a length of the connecting shaft 60 and opens at the first and second end portions 78, 80 thereof. The first end 78 of the connecting shaft extends through a bore 88 in the housing 18 at a location adjacent the first sensors 66. A bushing 90 is disposed in the housing bore 88 and supports the connecting shaft first end portion 78 for rotation with the output member 22.

The transmission 26 has a pinion gear shaft 92 which has opposed end portions 94, 96 and a longitudinal bore 98 opening at the opposed ends 94, 96. The connecting shaft 60 is disposed in the pinion gear shaft bore 98 and extends past both end portions 94, 96 thereof. The pinion gear shaft 92 is connected to the housing 18 and positioned between the power means 24 and the output member 22. The pinion gear shaft 92 extends along the output member axis 36 and is adapted to rotate about the output member axis 36 and to transfer rotary motion from the power means 24 to the output member 22. The pinion gear shaft 92 is supported in the housing by ring gear 100 which is rotatably connected to the housing via a plurality of bearings 102.

The first means 74 preferably includes a clamp 110 having first and second spaced apart end portions 114, 116 and a middle portion 118 which is connected to and between the first and second spaced apart end portions 114, 116. A means 120 fastens the first and second clamp end portions 114, 116 to the connecting and input shafts 60, 70 respectively. The clamp middle portion 118 is opened to and free from blocking the aperture 86 at the first end portion 78 of the connecting shaft so that an electric conductor 122 may pass from the aperture 86 at the first end portions 78 of the connecting shaft to a location spaced from the steering axle assembly 16.

A second sensor 184 which is preferably identical in construction to the first sensor 66 has a body 186 and input shaft 188 connected to the body 186 and rotatable about a longitudinal second sensor input shaft axis 190. The second sensor body 186 is mounted to the support bracket 28 by a carrier assembly 192 and the input shaft 188 is generally connected to the second end portion 44 of the spindle 38 by a coupling 194. The second sensor 184 is preferably a resolver adapted for delivering a pair of time varying signals wherein the difference between the average magnitudes and instantaneous phase angles of the signals is responsive to the angular rotational position of a wheel 196. The wheel 196 is mounted on the first end portion 42 of the spindle 38. The second end portion 80 of connecting shaft 60 is connected to the second sensor 184 and more specifically is connected to the carrier 192 via a rubber grommet 198 disposed in an aperture in the carrier 192. It is to be noted that the connecting shaft 60 protects the electrical conductor 199 in an exposed location between the first end portion 50 of the output member 22 and the second sensor 184.

Figure 2:
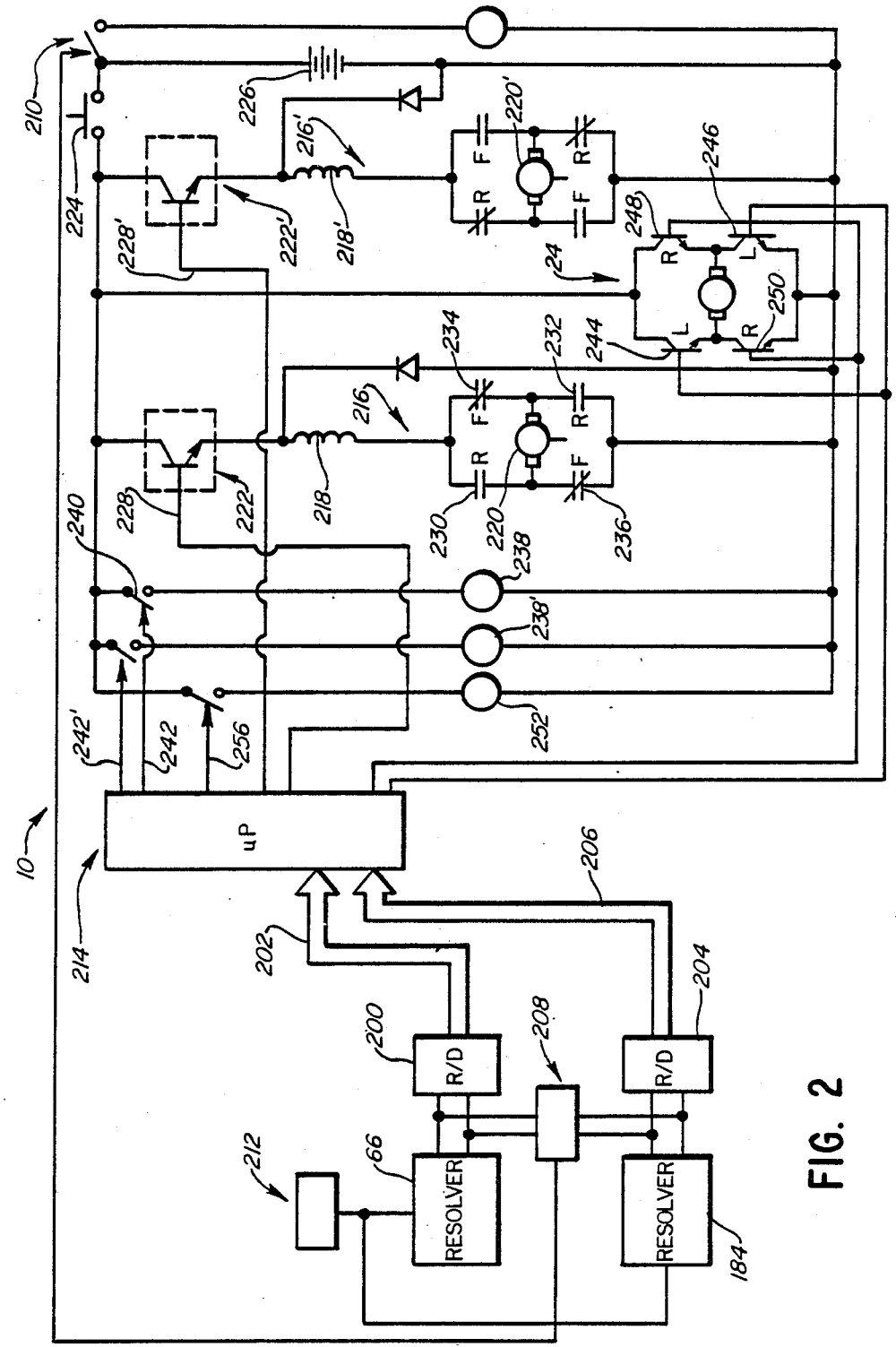
FIG. 2 is an electrical schematic of the vehicle drive system.

Referring now to FIG. 2 wherein the apparatus 10 for selectively discontinuing operating of the work vehicle drive system is illustrated. The first resolver 66 is electrically connected to a resolver-to-digital converter 200. The resolver to digital converter 200 is of a conventional design, for example, according to Model 1S4510 produced by Analog Devices, Inc. The R/D converter 200 accepts the analog signals produced by the resolver 66 in response to steering rotation of the steerable wheel 196 and produces a multi-bit signal on an output bus 202. Similarly, the resolver 184 is also electrically connected to a like resolver-to-digital converter 204. The converter 204 accepts the analog signals produced by the resolver 184 in response to rotation of the wheel 196 and produces a multi-bit signal on an output bus 206.

Further, both resolvers 66, 184 are electrically connected to a means 208 for receiving each of the time varying signals and delivering a fault signal in response to both the signals delivered by at least one of the resolvers 66, 184 being less than a preselected magnitude. The means 208 is in turn connected to a means 210 for interrupting power delivered to the drive system in response to receiving the fault signal. A means 212 maintains the time varying signals delivered by each of the resolvers 66, 184 at a substantially constant frequency. A detailed discussion of the operation of the means 208, 210, 212 is provided later in the specification in conjunction with the electrical schematic of FIG. 3.

The buses 202 and 206 are connected to input ports of a microprocessor 214. The microprocessor 214 effects control of a pair of vehicle drive motors 216, 216' and the steering motor 24. The AGV is preferably a three-wheel vehicle with the rear two wheels being driven by the motors 216, 216' and the third front wheel being steerable by the motor 24. Operation of the motors 216, 216' are substantially identical, thus a discussion of only the motor 216 will follow.

The drive motor 216 includes a field winding 218 and an armature 220 connected in series relationship through a switching means 222 and contactor 224 to a DC voltage supply 226 such as a lead acid battery. The switching means 222 is connected to an output port of the microprocessor 214 via a line 228. By modulating the duty cycle of a control signal over the line 228, the switching means 222 controls the torque of the drive motor 216. To effect forward and reverse control, a set of contactors 230, 232, 234, 236 are provided. The forward contactors 234, 236 are of the normally closed type while the reverse contactors 230, 232 are of the normally open type. Operation of the contactors 230, 232, 234, 236 is controlled by a contactor coil 238. When the contactor coil 238 is energized, the normally closed forward contacts 234, 236 open and the normally open reverse contactors 230, 232 close. Similarly, when the contactor coil 238 is not energized, the forward contactors close and the reverse contactors open. By closing the diagonal pairs of contactors 230, 232; 234, 236 the flow of current through the armature 220 can be controllably reversed. A Switching means 240 is disposed intermediate the contactor coil 238 and the battery 226 and is controlled by the microprocessor 214 over a line 242.

The steering motor 24 is frequently energized for relatively short periods of time in both directions to accomplish steering angle corrections. Thus, a contactor arrangement is not utilized to avoid contactor "chatter" caused by constant changes in direction of energization. The contactor arrangement of the motor 216 can be replaced by a similar transistor arrangement. A set of transistors 244, 246, 248, 250 are controlled in diagonal pairs to provide left and right steering motion. The bases of the transistors 244, 246 are interconnected to an output port of the microprocessor 214. Accordingly, the bases of the transistors 248, 250 are also interconnected to an output port of the microprocessor 214. Complemental energization of the output ports provides left and right steering motion by allowing current to controllably flow through the armature in opposite directions.

The apparatus 10 also includes electrically operable friction brakes. The brakes (not shown) are of the spring applied electrically released type, held off by energization of a winding 252. The microprocessor 214 controls a switching means 254 via a line 256 to controllably energize the winding 252 of the electrically actuable brakes. This arrangement provides for fail-safe braking of the vehicle in the event that electrical power is lost. For example, if the line contactor 224 is opened, power is discontinued to the winding 252 thus allowing the brakes to fully engage.

Figure 3:
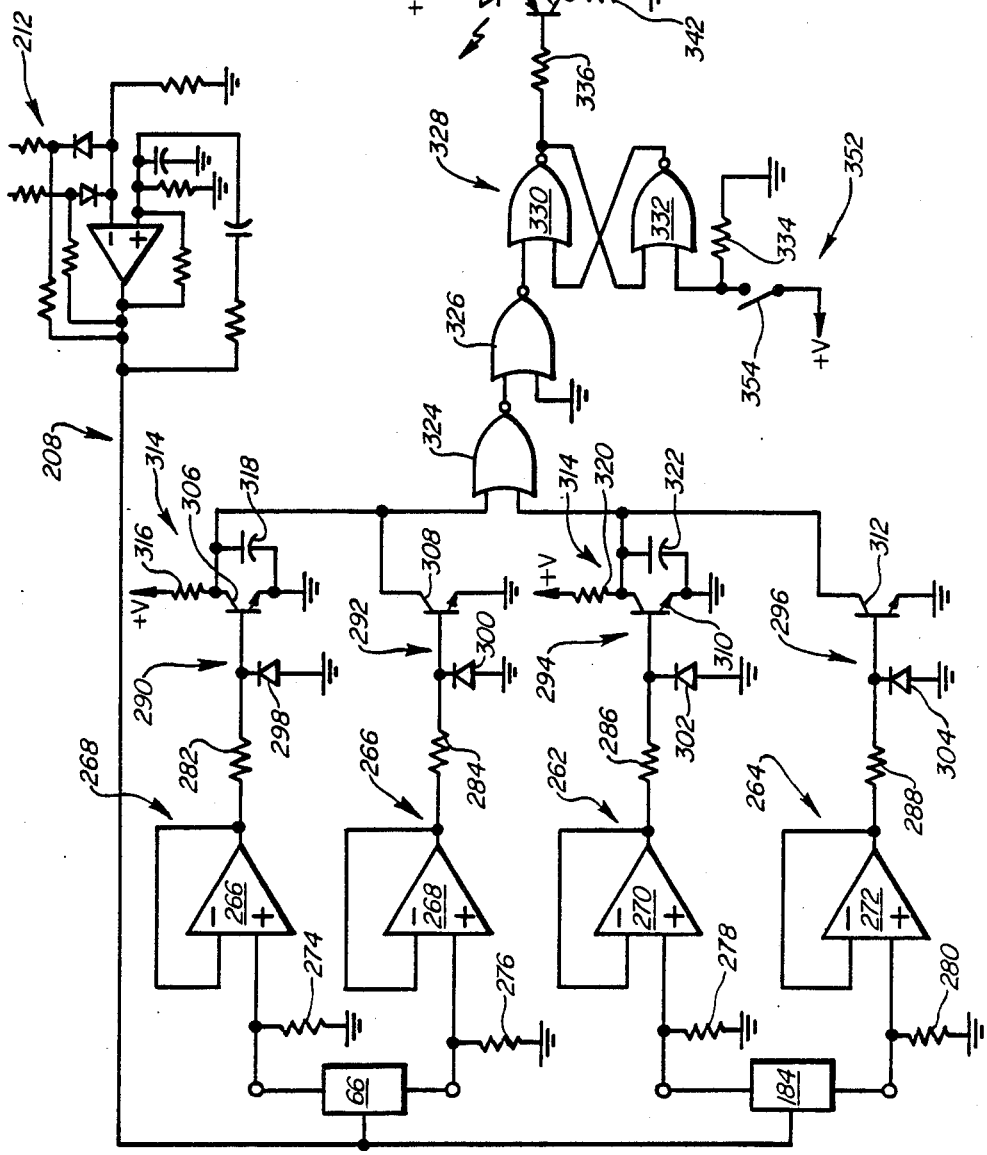
FIG. 3 is an electrical schematic of one embodiment of the present invention.

Referring now to FIG. 3 wherein the first and second resolvers 66, 184 are shown electrically connected to the means 208, 212. The means 212 includes a bridge oscillator circuit where the frequency of the output signal is related to a resistor and capacitor connected in series between the output and noninverting input. Bridge oscillators are well known in the industry and will not be further described here except to note that the output waveform is represented in FIG. 4e. The means 208 includes four voltage follower circuits 258, 260, 262, 264 each connected to an output of the resolvers 66, 184. Each of the voltage followers includes an operational amplifier 266, 268, 270, 272, each with a non-inverting input connected to an output of the resolver and to system ground through a respective resistor 274, 276, 278, 280. The non-inverting input of each operational amplifier 266, 268, 270, 272 is connected to its own output. The voltage followers provide electrical isolation for the electronic circuitry from the resolvers 66, 184. Each of the outputs of the operational amplifiers 266, 268, 270, 272 are connected through a current limiting resistor 282, 284, 286, 288 to the input of a half-wave rectifier 290, 292, 294, 296. The half-wave rectifiers respectively include a single diode 298, 300, 302, 304 with an anode connected to system ground and a cathode respectively connected to the resistor 282, 284, 286, 288 and to the base of a respective npn type transistor 306, 308, 310, 312.

The means 208 includes a means 314 for delivering the fault signal in response to both the signals delivered by at least one of the resolvers being less than a preselected magnitude for a preselected duration of time. The timer means 314 includes a resistor 316 and a capacitor 318 connected in series and the transistors 306, 308 connected in parallel with the capacitor 318. The transistors 310, 312 can also be connected in parallel with the capacitor 318 if a common timing of the two resolvers 66, 184 is desired. If, however, the timing requirements of the two resolvers 66, 184 differs, then the means 314 includes a second resistor 320 and capacitor 322 connected in series with the transistors 310, 312 connected in parallel with the capacitor 322.

The respective junctions of the resistors 316, 320 and capacitors 318, 322 are each connected to an input port of a NOR gate 324 such that either connection rising to a "high" level triggers the NOR gate 324 to provide a "low" signal. A second NOR gate 326 is connected as an inverter with one input from the output of the NOR gate 324 and a second input connected to system ground. The NOR gate 326 delivers a "high" signal in response to the means 314 not being reset by the resolver signals.

The fault signal delivering means 208 further includes a latching means 328 for maintaining the fault signal irrespective of the magnitudes of the resolver signals. More specifically, when the output signal from the second NOR gate 326 reaches a "high" level indicative of a fault, the latching means 328 maintains its output as an indication of a fault irrespective of the second NOR gate 326 later becoming a "low" value. The latching means 328 includes a pair of two input NOR gates 330, 332. Each of the NOR gates 330, 332 has its output connected to an input of the opposite NOR gate 332, 330. The second input to NOR gate 330 is connected to the output of the second NOR gate 326 and the second input of the NOR gate 332 is normally connected to system ground through a resistor 334. The output of the NOR gate 330 is also connected through a current limiting resistor 336 to the base of a PNP type transistor 338. The emitter of the transistor 338 is connected through a light emitting diode 340 to positive system voltage. The collector of the transistor 338 is connected to system ground through a resistor 342 and to the base of an NPN type transistor 346 through a resistor 344. The transistor 346 has an emitter connected to ground and a collector connected through resistor 348 to positive system voltage. The collector of the transistor 346 is also connected to the base of a power transistor 350 to controllably energize the line contacting coil 252. Thus, a fault signal from the means 208 ultimately biases the power transistor 350 "off" and drops out the line contactor 224 removing energization from the drive and steer motors and releasing the brake winding to engage the brakes.

The latching means 328 also includes means 352 for resetting the fault signal to be responsive to both the signals delivered by at least one of the resolvers 66, 184 being less than a preselected magnitude. The means 352 includes a manually operable switch 354 connected to the second input of the NOR gate 332 and to positive system voltage. Once the faulty resolver has been serviced to restore it to proper working condition, it is necessary to be able to remove the fault signal from the latching means 328. In the present embodiment, manual operation of the switch 354 will reset the latching means 328 if the fault condition is no longer being detected by the means 208. In the present embodiment, a manually operable switch 354 is integrally associated with the key switch of the vehicle. Proper operation may easily be restored by simply switching the vehicle OFF and then ON again.

INDUSTRIAL APPLICABILITY

In the overall operation of the vehicle 12, assume that it is operating properly under software control and moving toward a targeted destination. During travel, the resolver 184 rotates in unison with the wheel 196 producing a pair of AC signals which are shown graphically represented in FIGS. 4a–4d as S1 and S2. During each revolution of the wheel 196 the resolver 184 rotates through 360° effecting both the magnitude and phase relationships between the ac signals S1,S2.

Figure 4A:
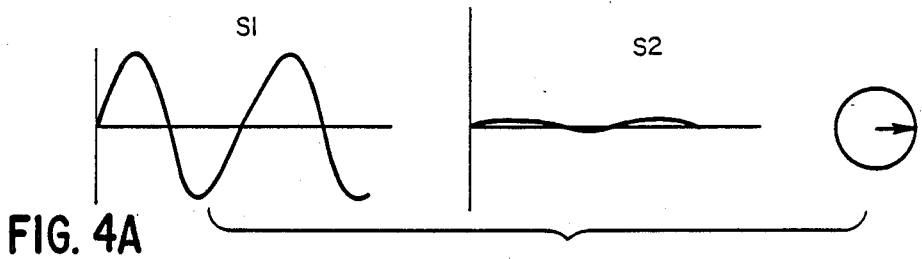
FIG. 4 is a graphic representation of wave forms associated with the embodiment of FIG. 3.

FIG. 4a illustrates the relative phase and magnitude relationships when the resolver shaft is positioned at 0°. At this position, the magnitudes of the two signals are at the extremes of their allowable amplitudes and are in phase. The signal S2 however, will not reach a magnitude sufficient to reset the timer circuit and thus, the loss of this signal will be momentarily undetected. Conversely, the signal S1 does reach a magnitude sufficient to reset the timer circuit during each cycle and a loss of this signal will result in a detected fault and discontinued operation of the vehicle 12. It should be noted that the conditions shown in FIG. 4a are highly transient during vehicle movement and the momentary inability to detect the loss of the signal S2 is of no consequence since a wheel revolution of less than 180° will produce signals S1, S2 where reset of the timer circuit is dependant solely on the magnitude of the signal S2. Accordingly, the loss of either signal will be detected within 180° of wheel rotation.

Figure 4B:
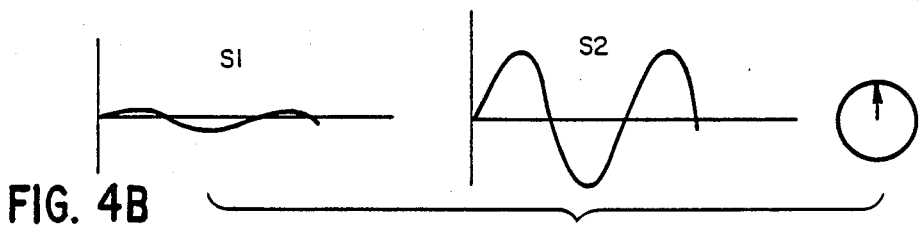
Figure 4C:
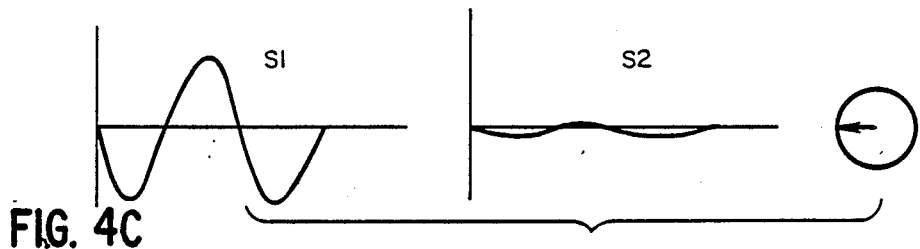
Figure 4D:
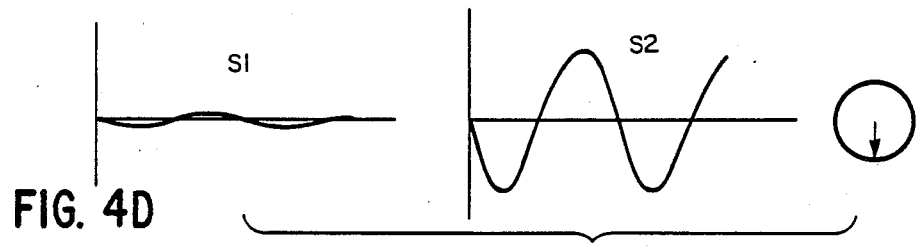
Figure 4E:
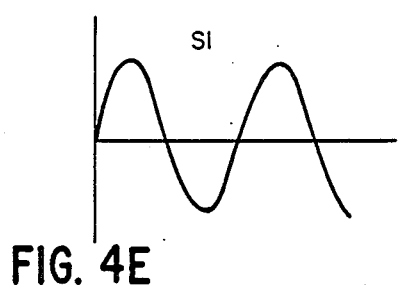

FIGS. 4b, 4c, and 4d respectively show the phase and magnitude relationships between the signals S1, S2 for shaft positions of 90°, 180°, and 270°. It should be noted that the phase relationships are inconsequential to operation of the fault detecting circuitry and only have bearing upon the R/D converters. The magnitude and frequency of the signals S1, S2 are the controlling parameters of the means 208, in that the period of these signals must be less than the period of the timer means 314 and the magnitude of at least one of the signals must be greater than the biasing voltage of transistors 306,308. If these conditions remain true, the vehicle will continue to operate.

The signals indicative of steering angle which are produced by the resolver 66 are substantially similar to those produced by the resolver 184. The exception being that the steering angle will not traverse a full 360°, but can produce very precise steering movements with a 180° range of travel. Understandably, the steering angle signals are not of the transitory nature of the wheel rotation signals and, correspondingly, the signals described at 0° and 180° are of greater significance. For example, a failure of the signal S2 while the shaft position is at 0° may go undetected until the next significant steering change. This shortcoming can be mitigated by selecting the shaft position of 90° to correspond to straight ahead steering and the shaft positions of 0° and 180° to full right and left respectively. Operation of the vehicle 12 will normally be in the straight ahead mode with periodic deviations and only occasional transient occurrences of full left or right steering. Resultantly, both of the outputs of the resolver 66 will normally be capable of fault detection. Similar results can be obtained by selecting 270° as the straight ahead steering position.

Other aspects, objects and advantages of this invention can be obtained from a study of the drawings, disclosure, and appended claims.

We claim:

1. An apparatus for selectively discontinuing operation of a work vehicle drive system, the work vehicle having a plurality of wheels wherein at least one of the wheels is controllably steerable, the apparatus comprising:
   a first resolver connected to and rotatable with at least one of the wheels of the work vehicle, the resolver being adapted for delivering a pair of time varying signals wherein the difference between the average magnitudes and instantaneous phase angles of the signals is responsive to the angular rotational position of the wheel;
   a second resolver connected to and rotatable with the steering angle of the steerable wheel, the resolver being adapted for delivering a pair of time varying signals wherein the difference between the average magnitudes and instantaneous phase angles of the signals is responsive to the angular steering position of the steerable wheel;
   means for receiving each of the time varying signals and delivering a fault signal in response to both the signals delivered by at least one of the resolvers being less than a preselected magnitude; and
   means for interrupting power delivered to the drive system in response to receiving the fault signal.

2. An apparatus, as set forth in claim 1, including means for maintaining the time varying signals delivered by each of the resolvers at a substantially constant frequency.

3. An apparatus, as set forth in claim 1, wherein the fault signal delivering means includes timer means for delivering the fault signal in response to both the signals delivered by at least one of the resolvers being less than a preselected magnitude for a preselected duration of time.

4. An apparatus, as set forth in claim 3, wherein the timer means includes a resistor and capacitor connected in series and a transistor connected in parallel with the capacitor.

5. An apparatus, as set forth in claim 3, wherein the fault signal delivering means includes latching means for maintaining the fault signal irrespective of the magnitudes of the resolver signals.

6. An apparatus, as set forth in claim 5, wherein the latching means includes means for resetting the fault signal to be responsive to both the signals delivered by at least one of the resolvers being less than a preselected magnitude.

7. An apparatus, as set forth in claim 1, including a controllably actuable brake wherein said means for interrupting power includes means for actuating the controllably actuable brake in response to receiving the fault signal.

* * * * *